(12) United States Patent
Argoitia et al.

(10) Patent No.: US 7,729,026 B2
(45) Date of Patent: Jun. 1, 2010

(54) SECURITY DEVICE WITH METAMERIC FEATURES USING DIFFRACTIVE PIGMENT FLAKES

(75) Inventors: Alberto Argoitia, Santa Rosa, CA (US); Dishuan Chu, Rohnert Park, CA (US); Neil Teitelbaum, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 536 days.

(21) Appl. No.: 11/609,406

(22) Filed: Dec. 12, 2006

(65) Prior Publication Data

US 2007/0139744 A1 Jun. 21, 2007
US 2010/0002275 A9 Jan. 7, 2010

Related U.S. Application Data

(60) Continuation-in-part of application No. 11/028,819, filed on Jan. 4, 2005, now Pat. No. 7,300,695, which is a division of application No. 10/243,111, filed on Sep. 13, 2002, now Pat. No. 6,902,807.

(60) Provisional application No. 60/750,694, filed on Dec. 15, 2005.

(51) Int. Cl.
*G03H 1/00* (2006.01)
*G02B 5/18* (2006.01)

(52) U.S. Cl. .......................... 359/2; 359/567

(58) Field of Classification Search .............. 359/2, 359/567; 283/86
See application file for complete search history.

(56) References Cited

U.S. PATENT DOCUMENTS

| 2,570,856 | A | 10/1951 | Pratt et al. |
| 3,011,383 | A | 12/1961 | Sylvester et al. |
| 3,123,490 | A | 3/1964 | Bolomey et al. |
| 3,412,575 | A | 11/1968 | Feldman et al. |
| 3,610,721 | A | 10/1971 | Abramson et al. |

(Continued)

FOREIGN PATENT DOCUMENTS

DE 4212290 5/1993

(Continued)

OTHER PUBLICATIONS

U.S. Appl. 11/535,618 filed Sep. 27, 2006, Argoitia.

(Continued)

*Primary Examiner*—Alessandro Amari
(74) *Attorney, Agent, or Firm*—Matthew A. Pequignot; Pequignot + Myers LLC

(57) ABSTRACT

A metameric optical structure is disclosed having first optical structures comprising diffractive flakes having diffractive structures thereon, and a second optical structures having non-diffractive flakes which may have other special effect properties, such as color shifting. At one angle of incidence or one viewing angle, near normal. The hues match and at other angles they do not match. The diffractive flakes are preferably magnetically aligned so that the grating structures are parallel. Disclosed is also an image formed of at least a first region of diffractive flakes and a second region of non-diffractive flakes wherein the regions are adjacent one another and wherein one of the regions forms a logo, symbol or indicia that appears or disappears in dependence upon the angle of viewing.

9 Claims, 12 Drawing Sheets

U.S. PATENT DOCUMENTS

| | | | |
|---|---|---|---|
| 3,622,473 A | 11/1971 | Ohta et al. | |
| 3,627,580 A | 12/1971 | Krall | |
| 3,633,720 A | 1/1972 | Tyler | |
| 3,676,273 A | 7/1972 | Graves | |
| 3,764,067 A | 10/1973 | Coffey et al. | |
| 3,790,407 A | 2/1974 | Merten et al. | |
| 3,791,864 A | 2/1974 | Steingroever | |
| 3,845,499 A | 10/1974 | Ballinger | |
| 3,853,676 A | 12/1974 | Graves | |
| 3,858,977 A | 1/1975 | Baird et al. | |
| 3,873,975 A | 3/1975 | Miklos et al. | |
| 3,926,659 A | 12/1975 | Bernhard et al. | |
| 3,949,139 A | 4/1976 | Dunning et al. | |
| 3,962,397 A | 6/1976 | Narui et al. | |
| 3,981,568 A | 9/1976 | Bartolomei | |
| 3,988,494 A | 10/1976 | McAdow | |
| 4,011,009 A | 3/1977 | Lama et al. | |
| 4,054,922 A | 10/1977 | Fichter | |
| 4,066,280 A | 1/1978 | LaCapria | |
| 4,099,838 A | 7/1978 | Cook et al. | |
| 4,105,572 A | 8/1978 | Gorondy | |
| 4,116,710 A | 9/1978 | Heikel | |
| 4,126,373 A | 11/1978 | Moraw | |
| 4,155,627 A | 5/1979 | Gale et al. | |
| 4,168,983 A | 9/1979 | Vittands et al. | |
| 4,197,563 A | 4/1980 | Michaud | |
| 4,213,886 A | 7/1980 | Turner | |
| 4,271,782 A | 6/1981 | Bate et al. | |
| 4,272,602 A | 6/1981 | Stemme et al. | |
| 4,309,075 A | 1/1982 | Apfel et al. | |
| 4,310,584 A | 1/1982 | Cooper et al. | |
| 4,321,087 A | 3/1982 | Levine et al. | |
| 4,323,904 A | 4/1982 | Edwards et al. | |
| 4,398,798 A | 8/1983 | Krawczak et al. | |
| 4,428,974 A | 1/1984 | Okita et al. | |
| 4,434,010 A | 2/1984 | Ash | |
| RE31,780 E | 12/1984 | Cooper et al. | |
| 4,543,551 A | 9/1985 | Petersen | |
| 4,552,593 A | 11/1985 | Ostertag | |
| 4,623,396 A | 11/1986 | Kimura et al. | |
| 4,626,445 A | 12/1986 | Dobrowolski et al. | |
| 4,629,512 A | 12/1986 | Kondis | |
| 4,705,300 A | 11/1987 | Berning et al. | |
| 4,705,356 A | 11/1987 | Berning et al. | |
| 4,721,217 A | 1/1988 | Phillips et al. | |
| 4,756,771 A | 7/1988 | Brodalla et al. | |
| 4,779,898 A | 10/1988 | Berning et al. | |
| 4,788,116 A | 11/1988 | Hochberg | |
| 4,810,524 A | 3/1989 | Nakayama et al. | |
| 4,838,648 A * | 6/1989 | Phillips et al. | 359/585 |
| 4,859,495 A | 8/1989 | Peng | |
| 4,867,793 A | 9/1989 | Franz et al. | |
| 4,879,140 A | 11/1989 | Gray et al. | |
| 4,930,866 A | 6/1990 | Berning et al. | |
| 4,931,309 A | 6/1990 | Komatsu et al. | |
| 4,940,523 A | 7/1990 | Takeshima | |
| 4,940,636 A | 7/1990 | Brock et al. | |
| 4,978,394 A | 12/1990 | Ostertag et al. | |
| 5,002,312 A | 3/1991 | Phillips et al. | |
| 5,009,486 A | 4/1991 | Dobrowolski et al. | |
| 5,059,245 A | 10/1991 | Phillips et al. | |
| 5,079,058 A | 1/1992 | Tomiyama | |
| 5,079,085 A | 1/1992 | Hashimoto et al. | |
| 5,084,351 A | 1/1992 | Phillips et al. | |
| 5,106,125 A | 4/1992 | Antes | |
| 5,116,664 A | 5/1992 | Kimura et al. | |
| 5,128,779 A | 7/1992 | Mallik | |
| 5,135,812 A | 8/1992 | Phillips et al. | |
| 5,142,383 A | 8/1992 | Mallik | |
| 5,171,363 A | 12/1992 | Phillips et al. | |
| 5,177,344 A | 1/1993 | Pease | |
| 5,190,807 A | 3/1993 | Kimock et al. | |
| 5,192,611 A | 3/1993 | Tomiyama et al. | |
| 5,198,042 A | 3/1993 | Masumoto et al. | |
| 5,200,855 A | 4/1993 | Meredith, Jr. et al. | |
| 5,214,530 A | 5/1993 | Coombs et al. | |
| 5,214,580 A | 5/1993 | Aparo | |
| 5,217,804 A | 6/1993 | James et al. | |
| 5,223,360 A | 6/1993 | Prengel et al. | |
| 5,225,057 A | 7/1993 | LeFebvre et al. | |
| 5,254,390 A | 10/1993 | Lu | |
| 5,278,590 A | 1/1994 | Phillips et al. | |
| 5,279,657 A | 1/1994 | Phillips et al. | |
| 5,281,480 A | 1/1994 | Phillips et al. | |
| 5,294,657 A | 3/1994 | Melendy et al. | |
| 5,332,767 A | 7/1994 | Reisser et al. | |
| 5,339,737 A | 8/1994 | Lewis et al. | |
| 5,356,471 A | 10/1994 | Reynders | |
| 5,364,467 A | 11/1994 | Schmid et al. | |
| 5,364,689 A | 11/1994 | Kashiwagi et al. | |
| 5,368,898 A | 11/1994 | Akedo | |
| 5,378,527 A | 1/1995 | Nakanishi et al. | |
| 5,383,995 A | 1/1995 | Phillips et al. | |
| 5,411,296 A | 5/1995 | Mallik | |
| 5,424,119 A | 6/1995 | Phillips et al. | |
| 5,435,240 A | 7/1995 | Fromm | |
| 5,464,710 A | 11/1995 | Yang | |
| 5,474,814 A | 12/1995 | Komatsu et al. | |
| 5,501,731 A | 3/1996 | Schmid et al. | |
| 5,549,774 A | 8/1996 | Miekka et al. | |
| 5,549,953 A | 8/1996 | Li | |
| 5,569,535 A | 10/1996 | Phillips et al. | |
| 5,571,624 A | 11/1996 | Phillips et al. | |
| 5,573,584 A | 11/1996 | Ostertag et al. | |
| 5,587,207 A | 12/1996 | Gorokhovsky | |
| 5,591,527 A | 1/1997 | Lu | |
| 5,593,773 A | 1/1997 | McKay et al. | |
| 5,607,504 A | 3/1997 | Schmid et al. | |
| 5,613,022 A | 3/1997 | Odhner et al. | |
| 5,624,076 A | 4/1997 | Miekka et al. | |
| 5,624,486 A | 4/1997 | Schmid et al. | |
| RE35,512 E | 5/1997 | Nowak et al. | |
| 5,627,663 A | 5/1997 | Horan et al. | |
| 5,629,068 A | 5/1997 | Miekka et al. | |
| 5,630,877 A | 5/1997 | Kashiwagi et al. | |
| 5,648,165 A | 7/1997 | Phillips et al. | |
| 5,650,248 A | 7/1997 | Miekka et al. | |
| 5,653,792 A | 8/1997 | Phillips et al. | |
| 5,672,410 A | 9/1997 | Miekka et al. | |
| 5,700,550 A | 12/1997 | Uyama et al. | |
| 5,742,411 A | 4/1998 | Walters | |
| 5,744,223 A | 4/1998 | Abersfelder et al. | |
| 5,763,086 A | 6/1998 | Schmid et al. | |
| 5,766,334 A | 6/1998 | Hashizume et al. | |
| 5,766,335 A | 6/1998 | Bujard et al. | |
| 5,790,304 A | 8/1998 | Sanders et al. | |
| 5,811,775 A | 9/1998 | Lee | |
| 5,815,292 A | 9/1998 | Walters | |
| 5,830,567 A | 11/1998 | Panush | |
| 5,856,048 A | 1/1999 | Tahara et al. | |
| 5,858,078 A | 1/1999 | Andes et al. | |
| 5,877,895 A | 3/1999 | Shaw et al. | |
| 5,902,111 A | 5/1999 | Lindsey | |
| 5,907,436 A | 5/1999 | Perry et al. | |
| 5,912,767 A | 6/1999 | Lee | |
| 5,914,817 A | 6/1999 | Browning et al. | |
| 5,926,317 A | 7/1999 | Cushing | |
| 5,989,626 A | 11/1999 | Coombs et al. | |
| 5,991,078 A | 11/1999 | Yoshitake et al. | |
| 6,013,370 A | 1/2000 | Coulter et al. | |
| 6,031,457 A | 2/2000 | Bonkowski et al. | |
| 6,033,782 A | 3/2000 | Hubbard et al. | |
| 6,043,936 A | 3/2000 | Large | |
| 6,045,230 A | 4/2000 | Dreyer et al. | |

| | | |
|---|---|---|
| 6,068,691 A | 5/2000 | Miekka et al. |
| 6,103,361 A | 8/2000 | Batzar et al. |
| 6,112,388 A | 9/2000 | Kimoto et al. |
| 6,114,018 A | 9/2000 | Phillips et al. |
| 6,132,873 A | 10/2000 | Dietz et al. |
| 6,150,020 A | 11/2000 | Dharmadhikary et al. |
| 6,150,022 A | 11/2000 | Coulter et al. |
| 6,157,489 A | 12/2000 | Bradley et al. |
| 6,165,260 A | 12/2000 | Gale |
| 6,168,100 B1 | 1/2001 | Kato et al. |
| 6,193,794 B1 | 2/2001 | Schmid et al. |
| 6,236,510 B1 | 5/2001 | Bradley et al. |
| 6,241,858 B1 | 6/2001 | Phillips et al. |
| 6,242,510 B1 | 6/2001 | Killey |
| 6,243,204 B1 | 6/2001 | Bradley et al. |
| 6,246,523 B1 | 6/2001 | Bradley et al. |
| 6,261,684 B1 | 7/2001 | Takahashi et al. |
| 6,284,032 B2 | 9/2001 | Andes et al. |
| 6,344,367 B1 | 2/2002 | Naya et al. |
| 6,383,638 B1 | 5/2002 | Coulter et al. |
| 6,387,498 B1 | 5/2002 | Coulter et al. |
| 6,399,228 B1 | 6/2002 | Simpson |
| 6,403,169 B1 | 6/2002 | Hardwick et al. |
| 6,475,609 B1 | 11/2002 | Whitney et al. |
| 6,501,601 B1 | 12/2002 | Takasuka et al. |
| 6,524,381 B1 | 2/2003 | Phillips et al. |
| 6,545,809 B1 | 4/2003 | Phillips et al. |
| 6,549,131 B1 | 4/2003 | Cote et al. |
| 6,565,770 B1 | 5/2003 | Mayer et al. |
| 6,569,529 B1 | 5/2003 | Phillips et al. |
| 6,572,784 B1 | 6/2003 | Coombs et al. |
| 6,586,098 B1 | 7/2003 | Coulter et al. |
| 6,589,331 B2 | 7/2003 | Ostertag et al. |
| 6,643,001 B1 | 11/2003 | Faris |
| 6,648,957 B1 | 11/2003 | Andes et al. |
| 6,649,256 B1 | 11/2003 | Buczek et al. |
| 6,686,042 B1 | 2/2004 | LeGallee |
| 6,692,031 B2 | 2/2004 | McGrew |
| 6,692,830 B2 | 2/2004 | Argoitia et al. |
| 6,712,399 B1 | 3/2004 | Drinkwater et al. |
| 6,744,559 B2 | 6/2004 | Phillips |
| 6,749,777 B2 | 6/2004 | Argoitia et al. |
| 6,749,936 B2 | 6/2004 | Argoitia et al. |
| 6,759,097 B2 | 7/2004 | Phillips et al. |
| 6,761,378 B2 | 7/2004 | Souparis |
| 6,761,959 B1 | 7/2004 | Bonkowski et al. |
| 6,777,085 B1 | 8/2004 | Argoitia et al. |
| 6,808,806 B2 | 10/2004 | Phillips et al. |
| 6,815,065 B2 | 11/2004 | Argoitia et al. |
| 6,838,166 B2 | 1/2005 | Phillips et al. ............ 428/323 |
| 6,841,238 B2 | 1/2005 | Argoitia et al. |
| 6,849,343 B2 | 2/2005 | Phillips et al. |
| 6,902,807 B1 | 6/2005 | Argoitia et al. |
| 6,903,850 B2 | 6/2005 | Kay et al. |
| 6,933,048 B2 | 8/2005 | Phillips et al. |
| 6,987,590 B2 | 1/2006 | Phillips et al. |
| 6,991,860 B2 | 1/2006 | Phillips et al. |
| 7,005,178 B2 | 2/2006 | Bonkowski et al. |
| 7,029,745 B2 | 4/2006 | Bonkowski et al. |
| 7,047,883 B2 | 5/2006 | Raksha et al. |
| 7,054,042 B2 | 5/2006 | Holmes et al. |
| 7,102,823 B2 * | 9/2006 | Schilling et al. ............ 359/566 |
| 2004/0009309 A1 * | 1/2004 | Raksha et al. ............ 427/598 |
| 2004/0094850 A1 | 5/2004 | Bonkowski et al. |
| 2004/0151827 A1 | 8/2004 | Argoitia et al. |
| 2004/0166308 A1 * | 8/2004 | Raksha et al. ............ 428/329 |
| 2005/0001038 A1 | 1/2005 | Walter et al. ............ 235/487 |
| 2005/0037192 A1 | 2/2005 | Argoitia et al. |
| 2005/0106367 A1 | 5/2005 | Raksha et al. |
| 2005/0123755 A1 | 6/2005 | Argoitia et al. |
| 2005/0128543 A1 | 6/2005 | Phillips et al. |
| 2005/0132929 A1 | 6/2005 | Raksha et al. |
| 2005/0287369 A1 | 12/2005 | Phillips et al. |
| 2006/0035080 A1 | 2/2006 | Argoitia |
| 2006/0077496 A1 | 4/2006 | Argoitia et al. |
| 2006/0194040 A1 | 8/2006 | Raksha et al. |
| 2006/0198998 A1 | 9/2006 | Raksha et al. |
| 2006/0204724 A1 | 9/2006 | Argoitia et al. |
| 2006/0228553 A1 | 10/2006 | Argoitia et al. |
| 2006/0263539 A1 | 11/2006 | Argoitia |
| 2006/0267241 A1 | 11/2006 | Argoitia |

FOREIGN PATENT DOCUMENTS

| | | |
|---|---|---|
| DE | 4343387 | 6/1995 |
| EP | 0194042 | 9/1986 |
| EP | 0341002 | 11/1989 |
| EP | 0353544 | 7/1990 |
| EP | 0395410 | 10/1990 |
| EP | 0556449 | 8/1993 |
| EP | 0406667 | 1/1995 |
| EP | 0686675 | 12/1995 |
| EP | 0710508 | 5/1996 |
| EP | 0753545 | 1/1997 |
| EP | 0756945 | 2/1997 |
| EP | 0953937 | 11/1999 |
| EP | 0978373 | 2/2000 |
| EP | 0984043 | 3/2000 |
| EP | 1239307 | 9/2002 |
| EP | 1353197 | 10/2003 |
| EP | 1498545 | 1/2005 |
| EP | 1 741 757 | 1/2007 |
| GB | 1107395 | 3/1968 |
| GB | 1131038 | 10/1968 |
| GB | 2276883 | 10/1994 |
| JP | 56130469 | 10/1981 |
| JP | 63172779 | 7/1988 |
| JP | 10147065 | 6/1989 |
| JP | 10259316 | 9/1998 |
| JP | 10316883 | 12/1998 |
| WO | WO 88/07214 | 9/1988 |
| WO | WO 93/23481 | 11/1993 |
| WO | WO 95/13569 | 5/1995 |
| WO | WO 96/22336 | 7/1996 |
| WO | WO 96/38505 | 12/1996 |
| WO | WO 98/12583 | 3/1998 |
| WO | WO 98/53011 | 11/1998 |
| WO | WO 00/08596 | 2/2000 |
| WO | WO 00/31571 | 6/2000 |
| WO | WO 00/34395 | 6/2000 |
| WO | WO 00/43457 | 7/2000 |
| WO | WO 01/03945 | 1/2001 |
| WO | WO 01/18127 | 3/2001 |
| WO | WO 01/53113 | 7/2001 |
| WO | WO 02/00446 | 1/2002 |
| WO | WO 02/40599 | 5/2002 |
| WO | WO 02/40600 | 5/2002 |
| WO | WO 02/053677 | 7/2002 |
| WO | WO 02/090002 | 11/2002 |
| WO | WO 03/006558 | 1/2003 |
| WO | WO 03/011980 | 2/2003 |
| WO | WO 03/102084 | 12/2003 |
| WO | WO 2004/024836 | 3/2004 |
| WO | WO 2005/017048 | 2/2005 |

OTHER PUBLICATIONS

Lotz et al., "Thick Optical Multi-Layer Systems on Pet Film", Precision, Applied Films, Nov. 2001, pp. 30-33.

Plaff et al, "Angle-Dependent Optical Effects Deriving From Submicron Sturctures of Films and Pigments", Chemical Reviews, ACS, Wahsington, DC, USA, vol. 99, No. 7, 1999, XP002219038, ISSN 009-2665 Sections II and V, pp. 1963-1981.

J.A. Dobrowolski, K.M. Baird, P.D. Carman and A. Waldorf, "Optical Interference Coatings for Inhibiting of Counterfeiting", Optica Acta, 1973, vol. 20 No. 12, pp. 925-937.

Craig R. Barrett, William D. Nix and Alan S. Tetelman, "*The Principles of Engineering Materials*", Prentice Hall, Inc., 1973, pp. 282-290.

William D. Callister, Jrl, *Materials Science and Engineering: An Introduction*, John Wiley & Sons, Inc., 1985, pp. 91-112.

John M. McKiernan et al, "*Luminescence and Laser Action of Coumarin Dyes Doped in Silicate and Aluminosilicate Glasses Prepared by Sol-Gel Technique*", Journal of Inorganic and Organometallic Polymers, vol. 1, No. 1, 1991, pp. 87-103.

Dr. Klause Greiwe, "*Colored Aluminum Pigments*", Eckart-Werke, Werk Guntersthal, $4^{TH}$ Nurnberg Congress, Paper 6, pp. 1-7.

Minolta Manual for "*Precision Color Communication: Color Control From Feeling to Instrumentation*", pp. 18, 20, 22, 23, 46-49.

The Mearl Corporation Brochure for *Mearl Iridescent Film*, Peekskill, New York.

B. Window et al, "*Magnetically Confined Sputter Source With High Ion Flux*", J. Vac. Sci. Technol. A 3(6), Nov./Dec. 1985, pp. 2368-2372.

N. Savvides and B. Window, "*Unbalanced Magetron Ion-Assisted Deposition and Property Modification of Thin Films*", J. Vac. Sci. Techno. A 4(3), May/Jun. 1986, pp. 504-508.

Chromaflair Light Interference Pigments, Technical Bulletin No. 2, "*Dynamic Color Area Diagram and Value*", TB-02-098.

Deborah W. Siegmann et al., "*Platinum II Polyamines: Determination of Size by Sephacryl Column Chromatography*", Department of Chemistry, Florida Atlantic University, Boca Raton, FL, 1987.

"*Sol-Gel Processing*", Internet Site, HTTP://FACULTY.WASHINGTON.EDU/GZACAO/GROUP/DOLGEL.HTM, Aug. 15, 2000.

Few's Sol-Gel Technology, "*Sol-Gel Technology*", Internet Site, HTTP://WWW.FEW.DE/EN/SOL-GEL.STM, Aug. 15, 2000.

Jean Phalippou, "*Sol-Gel: A Low Temperature Process for the Materials of the New Mellennimu*", The Sol-Gel Gateway, Internet Site, HTTP://WWW.SOLGEL.COM/ARTICLES/JUNE00/PHALIP/INTROSOLGEL.HTM, Aug. 15, 2000.

Jeffery I. Zink et al., "*Optical Probes and Properties of Aluminosilicate Glasses Prepared by the Sol-Gel Method*", Polymer Material Science and Engineering, No. 61, 1989, pp. 204-208.

Frans Defilet, Lgz Landis & Gyr Zug Corporation, "*Kinegrams 'Optical Variable Devices' (ODV's) for Banknotes, Secruity Documents an Dplastic Cards*", San Diego, Apr. 1-3, 1987.

S.P. McGrew, "*Hologram Counterfeiting: Problems and Solutions*", SPIE, vol. 1210, Optical Security and Anti-Counterfeiting Systems, 1990, pp. 66-76.

Rudolf L. Van Renesse, "*Security Design of Valuable Documents and Products*", Proc. of SPIE, vol. 2659, Jun. 1996, pp. 10-20.

S.P. McGrew, "*Countermeasures Against Hologram Counterfeiting*", Internet Site, HTTP://WWW.IEA.COM/NLI/PUBLICATIONS/COUNTERMEASURES.HTM. Jan. 6, 2000, pp. 1-19.

Roger W. Phillips, "*Optically Variable Films, Pigments, and Inks*", SPIE, vol. 1323, Optical Thin Films III: New Developments, 1990, pp. 98-109.

Roger W. Phillips, "*Optical Coatings for Document Security*", Applied Optics, vol. 35, No. 28, Oct. 1, 1996, pp. 5529-5534.

J.A. Dobrowolski et al., "*Research on Thin Film Anticounterfeting Coatings at the National Research Council of Canada*", Applied Optics, vol. 28, No. 15, Jul. 15, 1989, pp. 2702-2717.

J. Rolfe, "*Optically Variable Devices for Use on Bank Notes*", SPIE, vol. 1210, Optical Security and Anticounterfeiting Systems, 1990, pp. 14-19.

OVD Kinegram Cor, "*OVD Kinegram Management of Light to Provide Security*", Internet Site, HTTP://WWW.KIKNEGRAM.COM/XHOME/HOME.HTML, Dec. 17, 1999.

I.M. Boswarva et al., "*Roll Coaster System for the Production of Optically Variable Devices (OVD's) for Security Applications*," Proceedings, $33^{RD}$ Annual Technical Conference, Society of Vacuum Coaters, 1990, pp. 103-109.

Donald W. Tomkins, "*Transparent Overlays for Secrruity Printing and Plastic ID Cards*", Caribe Royale, Orlando, FL, Nov. 19-21, 1997, pp. 1-8.

The RD Mathis Company Manual for "*Thin Film Evaporation Source Reference*", Long Beach, CA.

Argoitia and Witzman, "*Pigments Exhibiting Diffractive Effects*", Soc. of Vac. Coaters, $45^{TH}$ Annual Tech. Conf. Proceed, 2002.

Van Renesse (ED), "*Optical Document Security*", $2^{ND}$ Ed., Artech House, 1997, pp. 254,349-369.

Powell et al. (ED), "*Vapor Deposition*" John Wiley & Sons, 1996, p. 132.

S.M. Prokes et al. (ED), "*Novel Methods of Nanoscale Wire Formation*", Mat. Research Soc., Bul., Aug. 1999, pp. 13-14.

Halliday et al., "*Fundamentals of Physics*", Sixth Edition, Jul. 2000, p. 662.

William Llewellyn, "*DOVIDS: Functional Beauty—Discussion About Holography*", Paper, Film and Foil Converter, Aug. 2002.

R. W. Hardin, "*Optical Tricks Designed to Foil Coutnerfeiters*", OE Reports, No. 191, Nov. 1999.

F.J. Himpsel et al., "*Nanowires by Step Decoration*", Mat. Research Soc. Bul., Aug. 1999, pp. 20-24.

Coombs et al., "*Integration of Contrascting Technologies Into Advanced Optical Security Devices*", Proc of SPIE, Conference on Document Security, Jan. 2004.

R.L. Van Renesse (ED), "*Diffraction-Based Security Features*", Optical Document Security, $3^{RD}$ ED., 2005, p. 171.

R.W. Phillips et al., "*Using Vacuum Roll Coaters to Produce Anti-Counterfeiting Devices*", S.V.C., $48^{TH}$ Annual Tech. Proc., 2005, p. 145-152.

R.W. Phillips et al., "*Security Enhancement of Holograms With Interference Coatings*", SPIE, San Jose, CA., vol. 3973, Jan. 27-28, 2000, pp. 304-316.

Edward Boyle, "*Foiling Counterfeiters*", HTTP://PFFC-ONLINE.COM/MAG/PAPER_FOILING_COUNTERFEITERS/, Aug. 1, 2002.

E.G. Lowen et al., "*Diffraction Gratings and Applications*", Marcel Dekker Inc., New York, 1997.

Argoitia, "*Thin Film and Diffractive Interference Applied to the Design of Pigments*", Proceedings of Design and Technology of Coatings Conference, Bonassola, Italy, Sep. 24-27, 2003.

Argotia et al., "The Concept of Printable Holograms Through the Alignment of Diffractive Pigments", Proc. of SPIE, San Jose, CA, vol. 5310, Jan. 2004.

Argoitia et al., "*The Security Enhancement of Diffractive Optically Variable Image Devices*", Proc. of SPIE, vol. 6075, Jan. 2006.

S.A. Letts et al., "*Ultrasmooth Plasma Polymernized Coatings for Laser Fusion Targets*", J. Vac. Sci. Tech., 19(3), Sep./Oct. 1981, pp. 739-742.

K. Sugai et al., "*Aluminum Chemical Vapor Deposition With New Gas Phase Pretreatment Using Tetrakisdimethylamino-Titanium for Ultralarge-Scale Integrated Circuit Metallization*" J. Vac. Sci. Tech., B 13(5), Sep./Oct. 1995.

T. Ellison et al., "*New High Speed, Low Coast, Roll-To-Roll Antireflectivity Coating Technology*", Proc. of the Soc. of Vac. Coaters, New Orleans, Apr. 1997, pp. 14-17.

L. Martinue et al., "*Search for High Index Pecved Optical Coating Materials: the Case of Titanium Dioxide*", $43^{RD}$ Annual Tech. Conf. Proceedings, Denver, CO., Apr. 15-20, 2000.

J. Kang et al., *Metalorganic Dhemical Vapor Deposition of Nickel Films From NI(C5H5)2/H2*, J. Mater. Res., vol. 15, No. 8, Aug. 2000.

H. Takashashi, "*Temperature Stability of Thin-Film Narrow-Bandpass Filters Produced by Ion-Assisted Deposition*", Applied Optics, vol. 34, No. 4, Feb. 1, 1995.

Argoitia, "Pigments Exhibiting a Combination of Thin Film and Diffractive Light Interference", AIMCAL 2002, Fall Technical Conference Meeting (Oct. 20, 2002).

\* cited by examiner

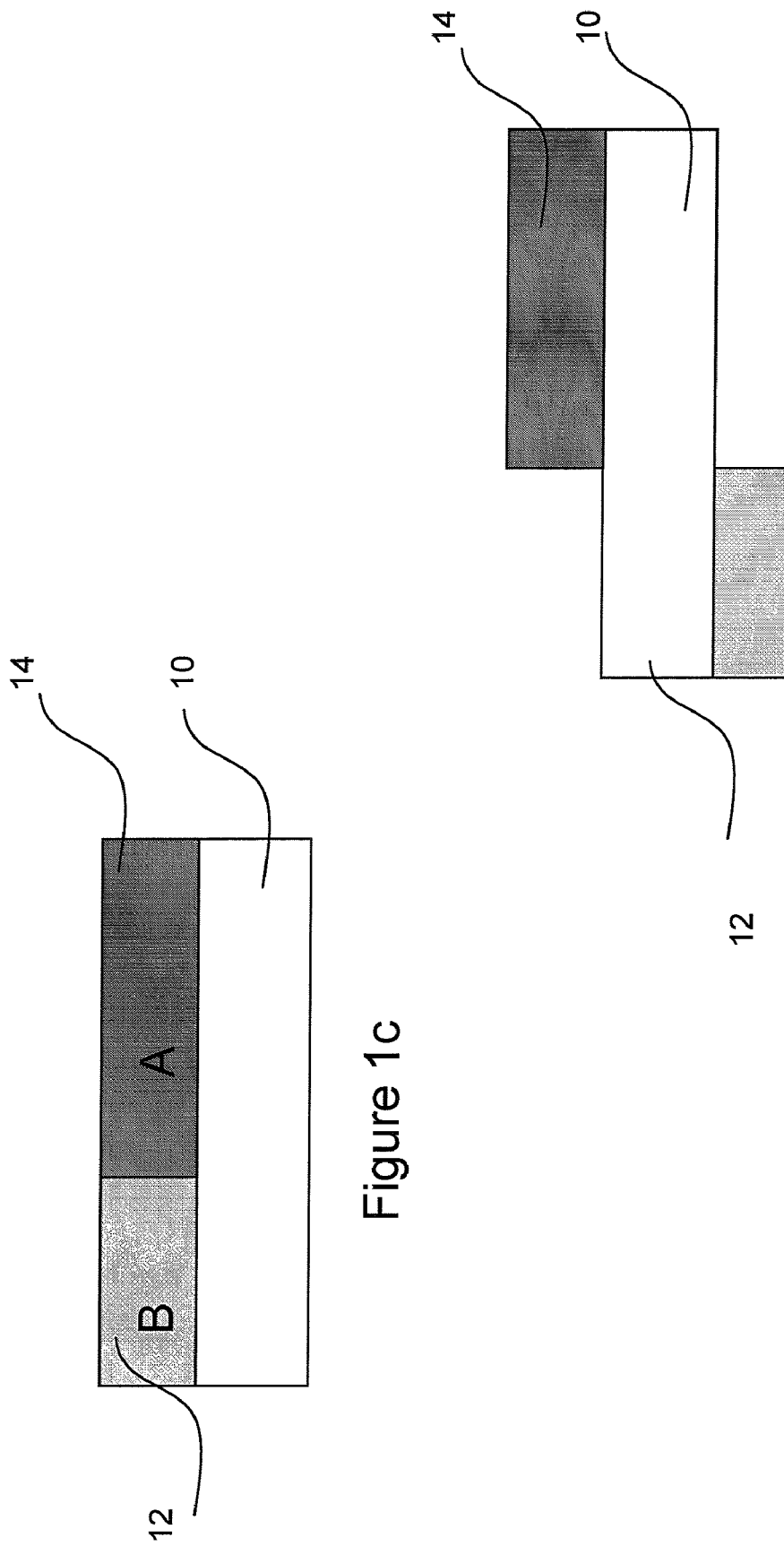

SECURITY DEVICE WITH METAMERIC FEATURES USING DIFFRACTIVE PIGMENT FLAKES

CROSS-REFERENCES TO RELATED APPLICATIONS

This application claims priority of U.S. Provisional Patent Application No. 60/750,694 filed Dec. 15, 2005, entitled "METAMERIC COMBINATIONS INCLUDING DIFFRACTIVE PIGMENTS" which is incorporated herein by reference for all purposes. This application is also a continuation-in-part application of U.S. application Ser. No. 11/028,819 filed Jan. 4, 2005, now issued U.S. Pat. No. 7,300,695, which is a divisional application of U.S. application Ser. No. 10/243,111 filed Sep. 13, 2002, now issued U.S. Pat. No. 6,902,807.

FIELD OF THE INVENTION

This invention relates to a security device having paired optically variable structures suitable for use in inks or paints or, suitable for applying to a substrate in the form of ink or paint.

Color from interference thin films is found in nature in fish scales, mother of pearl, etc. Naturally occurring mica, oil slicks and soap bubbles all display to some degree a level of iridescence. This iridescence or change in color as the viewing angle is changed, is a direct result of light reflecting from parallel interfaces from single or multilayer thin films. In general, the larger the refractive index difference across the interface(s) the greater the color effect. Color results from the interference of light. Maximum destructive reflective light interference occurs when the thickness of the layers are an odd number of quarter waves whereas maximum constructive light interference occurs when the thickness of the layers are an even number of quarter waves. Iridescent coatings which are called nacreous pigments when broken into small platelets are described in U.S. Pat. Nos. 3,087,828 and 3,123,490. These nacreous pigments are composed of single layer or multi-layers in the optical thicknesses ranging from 10-100 nanometers typically prepared by vacuum deposition processes. These nacreous pigments are white or silvery and have very low color saturation regardless of the viewing orientation. Color is due mainly to simple Fresnel light reflection, scattering and/or absorption. Within many applications, it is desirable to achieve greater color saturation, i.e., chroma, than that can be achieved with nacreous pigments. In addition to chroma, there is a need for different colors and different color combinations which can be generated by using optically variable pigments. There is a particular need for such a multitude of colors for numerous anti-counterfeiting applications as well as other applications. U.S. Pat. No. 6,114,018 in the name of Phillips et al. teaches a paired optically variable structure wherein a color shifting region on a security device matches a non-color shifting region at a particular angle of viewing. For example a green-to-blue color shifting coating will appear green having an adjacent blue non-shifting region, and if tilted at a particular angle, it will appear as two blue matching regions.

Although Phillips' device functions as it is intended, and is commercially desirable, there is a need to increase the security of the device. By so doing, a more difficult to copy and more complex device having additional optical effects has resulted.

Optically variable pigments may be based on diffraction, rather than color shifting. Diffractive pigments are described in U.S. Pat. Nos. 6,692,830, 6,749,777, 6,749,936, 6,815,065, 6,841,238, and 6,902,807.

Diffractive optically variable image devices ("DOVID"), such as orientable diffractive pigment flakes and stereograms, kinegrams, graphic element-oriented devices, dot-oriented devices, and pixel-oriented devices, and oriented optically variable pigment flakes may be formed with diffractive optical flakes.

Optically variable pigments ("OVP's"™) are used in a wide variety of applications. They can be used in paint or ink, or mixed with plastic. Such paint or ink is used for decorative purposes or as an anti-counterfeiting measure on currency.

As described above, one type of OVP uses a number of thin-film layers on a substrate that form an optical interference structure. Generally, a dielectric (spacer) layer is formed on a reflector, and then a layer of optically absorbing material is formed on the spacer layer. Additional layers may be added for additional effects, such as adding additional spacer-absorber layer pairs. Alternatively optical stacks composed of layers of (high-low-high)$^n$ or (low-high-low)$^n$ dielectric materials, or combinations of both, may be prepared.

Another type of pigment uses a pattern, such as a series of grooves etched or stamped into a layer of material to create a diffractive interference structure. These pigments are known as diffractive pigments and have been used to create an iridescent effect, both on printed media and in paints, such as automotive paint.

There are other products that use diffractive interference to achieve a desired effect, which are generally known as diffractive, optically-variable image devices ("DOVIDs").

Some DOVIDs provide various images depending on the angle at which they are viewed. For example, some types of DOVIDs can make one printed object appear in front of another, provide a succession of images based on viewing angle, or give the appearance of motion in a two-dimensional image as the angle of view is changed. Other DOVIDs might have an image that appears at one viewing angle, and disappears at another. DOVIDs have been used for anti-counterfeiting purposes on bank notes, credit cards, software media, and other high-value documents, as well as for decorative purposes. A particular type of DOVID is known as a "pixel-gram". A pixel-gram is based on a non-uniform spatial distribution of different linear diffraction areas (pixels). When rotated or tilted, different images can appear or disappear, making the pixel-grams difficult to counterfeit because even a high-quality color photocopier will not copy the variable effects of the image.

The techniques used to achieve holographic microstructures on a master hologram, such as interferometry, holography, chemical etching, ion beam lithography, and electron beam lithography are relatively complex and expensive. After a master hologram is prepared, a replication tool from the master is typically generated. The replication tool presses the surface relief microstructure into a polymeric foil, which is then aluminized on the back of the foil. The foil is then stamped on the document. A master hologram must be made for each new image, or if the master hologram wears out.

It is an object of one embodiment of this invention to provide a security device that achieves security afforded to color shifting coatings, and which achieves security afforded to diffractive structures, and which achieves an additional strengthened security by coupling color-shifting and diffractive images together in a novel way whereby, their colors match at only a particular, predetermined angle of incidence.

It is an object of this invention to provide a security device that weds together a structure having a region with diffractive magnetically or electrically oriented flakes with a region having flakes of another type, such as chromatic or achromatic reflective flakes, tinted reflective flakes, or color shifting flakes.

It is another object of this invention to provide a security device that combines diffractive flakes with non-diffractive flakes in a manner such that their colors match at only one particular angle or narrow range of angles. These diffractive and non-diffractive flakes may be mixed together, or in a preferred embodiment may be placed on different regions of the same substrate.

SUMMARY OF THE INVENTION

In accordance with the invention, there is provided, an optically variable article comprising a substrate having a first surface and first and second optical devices formed on first and second regions carried by said first surface, one of the first and second optical devices being optically variable and forming a pair carried by the first surface of the substrate in spaced-apart positions supported by the first surface of the substrate to permit viewing at the same time by the human eye, said first and second optical devices having the same matching color at one angle of incidence between 0 degrees and 90 degrees for a color match angle and being without color match at other angles of incidence, wherein one of the first and second optical devices comprises diffractive optical flakes each having a diffractive pattern defined thereon or thereon, wherein said flakes are oriented along the diffractive pattern.

In accordance with the invention there is provided an optically variable article comprising two color matching regions that match in color at a predetermined angle and are unmatched at other angles of incidence of light, and wherein one of the two regions have groove aligned diffractive flakes therein and wherein the other region has non-diffractive flakes.

In accordance with an embodiment of the invention, there is provided, an optically variable article comprising a substrate having a first surface and first and second optical devices carried by said first surface, wherein each of said first optical devices is a diffractive pigment flake, and wherein said second optical devices are non-diffractive flakes having an optical effect, said first and second optical devices in positions supported by the first surface of the substrate to permit viewing at the same time by the human eye, said first and second optical devices having the same matching color at one angle of incidence between 0 degrees and 90 degrees for a color match angle and being without color match at all other angles of incidence, wherein the color match occurs when essentially no diffractive effects are seen.

In accordance with an aspect of this invention two optical structures are provided which match in color more closely when viewed at an angle where diffraction is absent, that is, where zero order diffraction occurs and all other orders are not present at the viewing angle. The optical structures may be two regions covered with flakes, wherein one region includes diffractive flakes and the other region includes non-diffractive flakes, or wherein both regions include diffractive flakes having different frequencies. In an alternative, less preferred embodiment of this invention semi-transparent diffractive flakes maybe used over a colored region, wherein a color match with the region under the diffractive flakes is a result of the diffractive flakes being transparent, and allowing the color of the other region to show through.

In accordance with a broad aspect of this invention there is provided, an optically variable article comprising:

a substrate having a first surface and a second surface, first and second optical devices formed on first and second regions carried by said first surface or said second surface, one of the first and second optical devices being optically variable and forming a pair carried by the substrate in spaced-apart positions to permit viewing at the same time by the human eye, wherein said first and second optical devices appear to the human eye to have the same matching color at one angle of incidence between 0 degrees and 90 degrees for a color match angle and being without color match at other angles of incidence, wherein one of the first and second optical devices comprises one or more diffractive optical flakes having a diffractive pattern defined thereon or thereon

BRIEF DESCRIPTION OF THE DRAWINGS

FIG. 1c is a side view of a first embodiment of FIG. 1b.

FIG. 1d is a side view of a second embodiment of FIG. 1b.

DETAILED DESCRIPTION

Figure 1B:
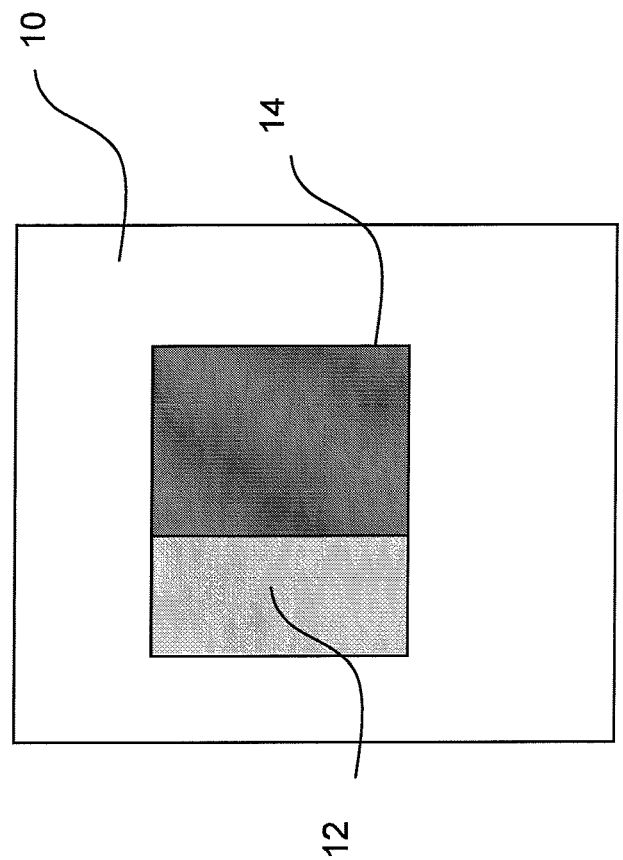
FIG. 1b is a plan view of a substrate having a first non-diffractive coating spanning a first region adjacent to a region having a coating of diffractive pigment flakes.

Devices described here after, refer to embodiments wherein an optically variable image device (OVID) is provided and is particularly useful for security applications as it is difficult to counterfeit.

Referring now to FIGS. 1a through 1d, distinct coated regions are shown having an optical structure 14 in the form of a diffractive coating adjacent or near a different optical structure having a coating 12 coated on a substrate 10. In accordance with a preferred embodiment of this invention, a substrate is printed or coated in a first area with magnetically alignable diffractive pigments (MADPs) 12. These pigments can be manufactured using a single layer of material, for example nickel, or other preferably reflective materials that can be formed or stamped to form a diffractive pattern. Alternatively, the MADPs can be made from a multilayer stack to produce color from diffraction and thin film interference. The flake or flakes within the coating 14 and coating 12 are said to have different optical properties. By this, it is to be understood that the flakes are either of a different composition or different structure. For example two diffractive flakes having different frequency gratings are understood to have different optical properties. Flakes that are color shifting and flakes that are non-color shifting are said to have different optical properties. An absorbing flake and a reflective flake have different optical properties; diffractive and non-diffractive flakes are said to have different optical properties. However flakes of a same material having a same grating embossed therein are not said to have different optical properties, even if their orientation is different. By different optical properties, it is meant that the inherent structure is different between the two flakes or coatings.

The coatings 12 and 14 having different optical properties are said to be spaced apart, which for all intents and purposes includes side-by-side, on opposite sides of a substrate, one over the other, or one near the other. To be spaced apart, no gap therebetween is required, although as in FIG. 1d, a gap may be present.

Embodiments of this invention were created by matching a non-diffractive pigment with a diffractive pigment or with diffractive pigments having gratings of different frequencies. In some instances the color matching was obtained by the addition of appropriate amounts of organic tints. Chroma and lightness were adjusted by adding black or neutral transparent or non transparent pigments to an ink or paint formulation.

It is well known that the appearance of printed colors is dependent upon the illumination intensity, and viewing conditions. For example, a color under fluorescent lights may appear differently from the same color under a tungsten lamp; and a color under diffuse illumination, for example on a cloudy day, will differ compared to the color under direct illumination, for example in direct sunlight.

For the purposes of this invention, color matching was accomplished by measurement of different areas under diffuse illumination. A diffuse geometry spectrocolorimeter (DataColor SF600, d/8 integrating sphere) was used and a CIE Lab delta E value of 10 or less was considered to be for all intents and purposes, a same color match.

Delta E is defined as:

Delta $E$ = Square root of $[(a_1^*-a_2^*)^2 + (b_1^*-b_2^*)^2 + (L_1^*-L_2^*)^2]$ Referring now to Table 1, a first embodiment of this invention was made by providing an OVID that consisted of two adjacent areas, of printed effect pigments. Print combination 1 referred to hereafter as (C1) was made with samples Y3100 and Y2. Print combination 2 referred to hereafter as (C2) was made with Y1400 and Y2, and print combination (C3) was made with samples Y3100 and Y1400.

TABLE 1

|  | Y2 | Y3190 | Y1400 |
|---|---|---|---|
| Nazdar MP-170 screen ink | 10 | 10 | 10 |
| U.S. Aluminium | 1 | 0.6 | 0.8 |
| Bright Silver-Non Diffractive | 0.1 | — | — |
| Silver-Diffractive 3100 l/mm | — | 0.1 | — |
| Silver-Diffractive 1400 l/mm | — | — | 0.1 |

*values in mg.

Table 1 shows the formulations of the three pigments used in these three sub-embodiments to make combinations C1, C2 and C3. When magnetic diffractive pigments are used, as in Y3100 or Y1400, before the ink is cured the print is placed in a magnetic field that causes the diffractive pigments to align with their diffraction grooves parallel to the applied magnetic field. In this instance the grooves of the flakes are parallel to another. The printed region 14 is then cured in the field. In the case of C1 and C2, only region A was cured in the magnetic field. For the combination C3, where two magnetically orientable groups of flakes were used, both regions A and B, optical structures 14 and 12 respectively, were cured in the presence of a magnetic field.

TABLE II

|  | L* | a* | b* | C* | Hue | ΔHue | ΔE |
|---|---|---|---|---|---|---|---|
| Comb. C1 |  |  |  |  |  |  |  |
| Y2 | 55.42 | −3.02 | 28.7 | 28.93 | 96 |  | 13 |
| Y3100 | 66.26 | −2.65 | 36.15 | 36.25 | 94.18 | 1.82 |  |
| Comb. C2 |  |  |  |  |  |  |  |
| Y2 | 55.42 | −3.02 | 28.77 | 28.93 | 96 |  | 7 |
| Y1400 | 60.58 | −3.04 | 33.77 | 33.91 | 95.15 | 0.75 |  |
| Comb. C3 |  |  |  |  |  |  |  |
| y1400 | 60.58 | −3.04 | 33.77 | 33.91 | 95.15 |  | 6 |
| Y3100 | 66.26 | −2.65 | 36.15 | 36.25 | 94.18 | 0.97 |  |

The diffuse color measurement of regions A and B are presented in Table II. The resulting delta E and delta hue show that the measured colors are for all intents and purposes, very close and could be further improved by small changes on the formulations of Table 1.

In the case of combinations C1 and C2, as the samples are tilted to higher viewing angles under direct illumination, the diffractive colors from region A become visible, while region B displays no diffractive color effects. In the case of C3, regions A and B will both display diffractive colors, but at different viewing angles owing to the different grating frequencies.

For the color measurement under direct illumination, a Model GSP-1B goniospectrophotometer manufactured by Murakami Color Research Labs was used. This instrument is capable of measuring color under a variety of different illumination and viewing angles. As illustrated in FIG. 1e, the illumination was fixed at −80° incidence and the viewing angle was varied from −65° to 80° by 5 degrees steps.

Figure 2:
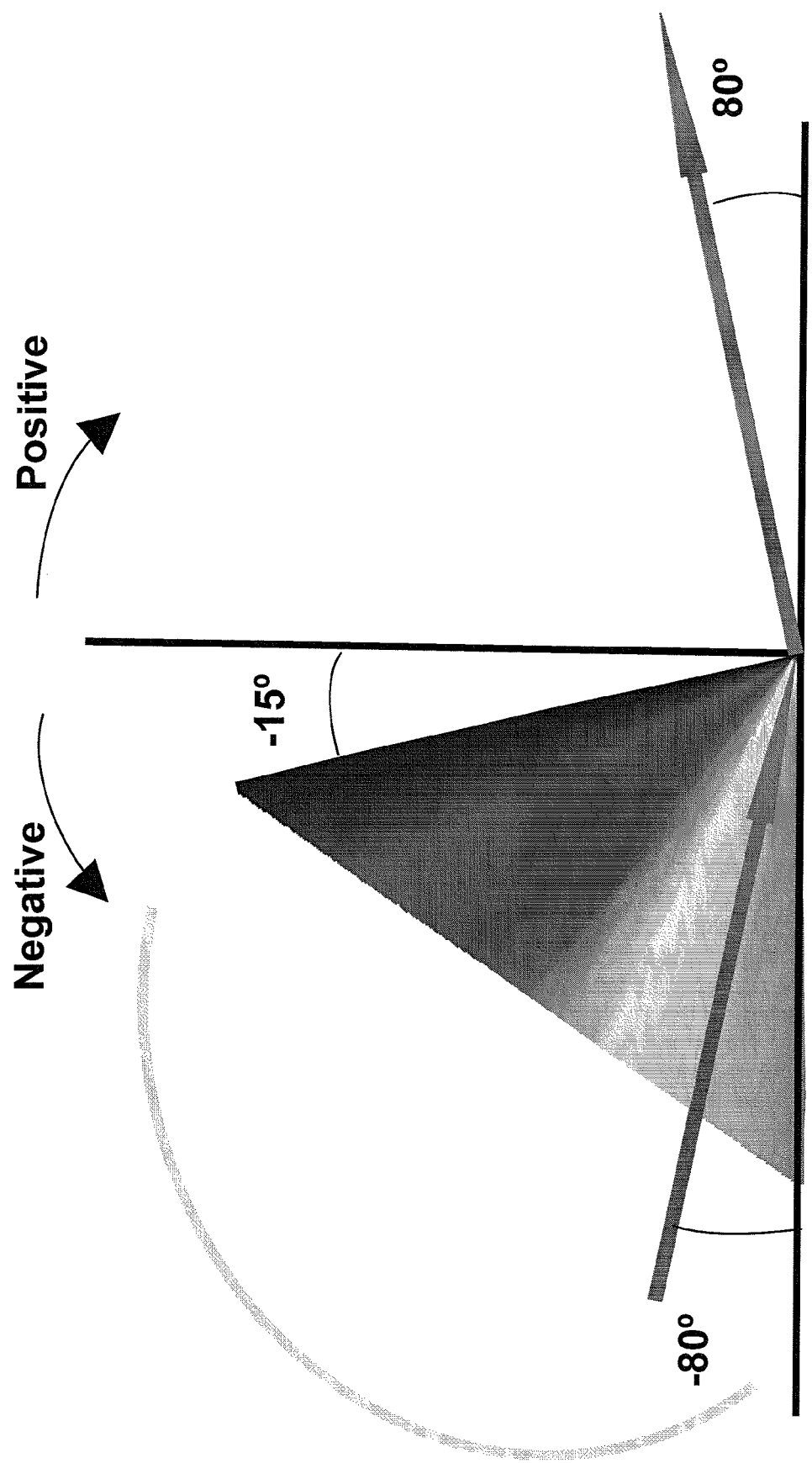
FIG. 2, schematically shows the separation of incident white light incident at −80° on a diffraction grating having a groove frequency of 3100 lines per millimeter (l/mm).

FIG. 2, schematically shows the separation of incident white light in the case of −80° incidence on a grating with a groove frequency of 3100 lines per millimeter (l/mm). For this frequency and angle of incidence, only the $-1^{st}$ order is partially observed at about −15° viewing, starting at violet (400 nm) and passing through blue and green until an orange color (corresponding to a wavelength of about 600 nm) is observed at high angles (close to 90°).

In the example with a grating with a groove frequency of 1400 l/mm, and for the same angle of incidence, the $-1^{st}$, $-2^{nd}$ orders with are completely observed when light in the visible from 400 to 700 nm is used. The $3^{rd}$ order is partially observed with a green-blue coloration. In is notable that the intensity of the orders decreases as the number of the order increases.

When a dye or a colorant is added to the formulation, the pigments continue to disperse the light. However, the dispersed light no longer shows all the colors of the rainbow since some of the rays will be partially "filtered" by the colorant utilized (yellow in this case).

The Murakami color results are plotted in an a*, b* plot of the CIELAB system. In this system, +a* and −a* represent red and green and +b* and −b* represent yellow and blue respectively. The lightness of the color is on an axis orthogonal to the plane changing from black (L*=0) to white (L*=100). A color will be grey in the center of the plane with the chroma increasing when moving away from the center.

This invention uses the range of viewing angles utilizing a diffractive grating where there is no diffraction, for example, in FIG. 2, between normal and −15 degrees, to match the native color of the diffractive material or dye, in the instance where dye is added, with another region to provide a metameric device.

Figure 4:
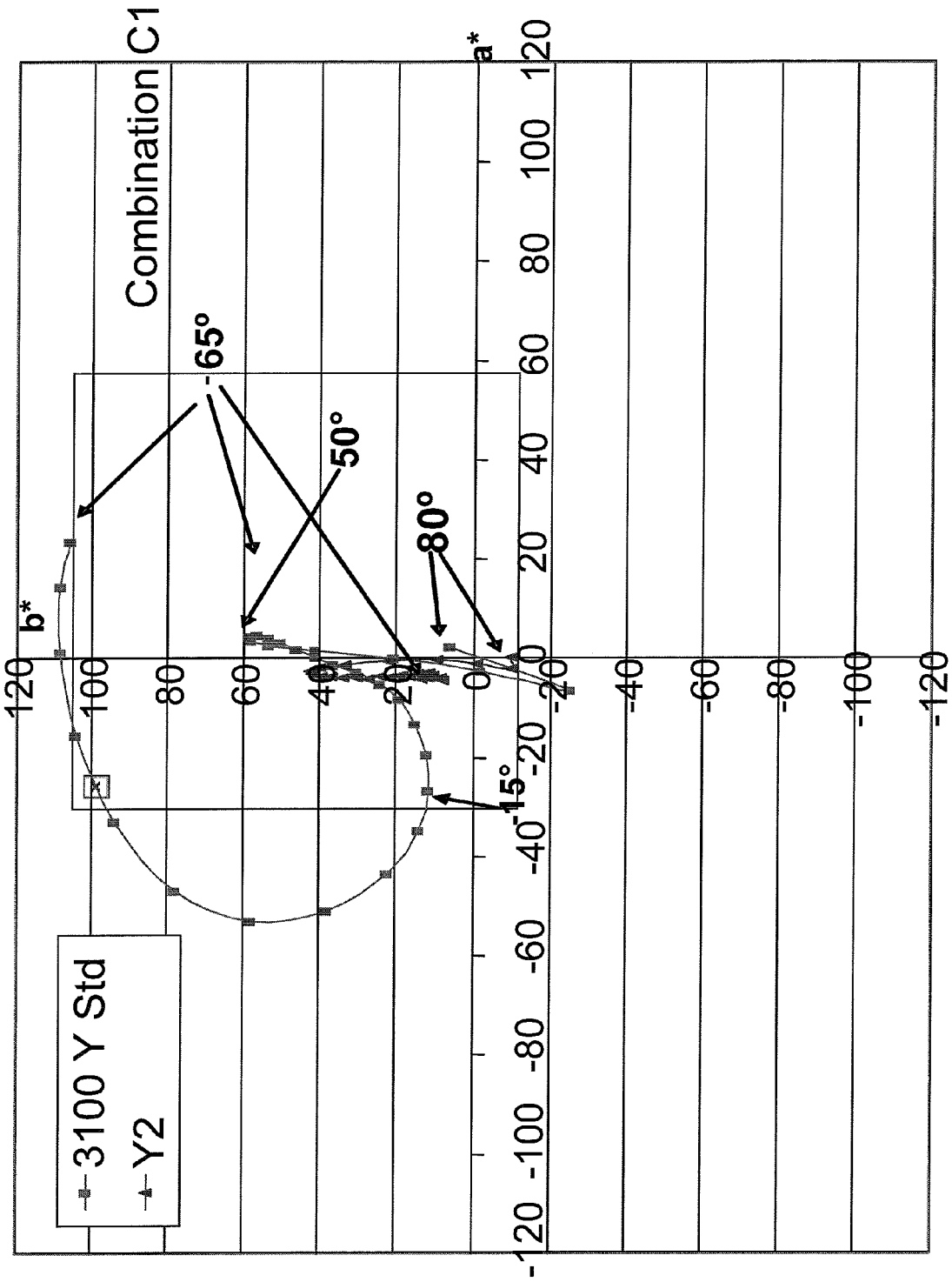
FIG. 4 is a plot illustrating color trajectories and chromaticity for the formulations corresponding to the combination C1 under direct illumination, where the angle of incidence was fixed at −80° and the viewing angle was varied between −65° to 80° in 5 degree increments.

FIG. 4 shows the results for the formulations corresponding to the combination C1. Formulation 3100Y shows strong diffractive colors starting in the $1^{st}$ yellow-red quadrant and sweeping to the $2^{nd}$ quadrant (yellow-green) as the viewing angles goes from −65° to −15° degrees. After −15° there is a sharp drop in chromaticity since diffractive effects occur only at higher angles for this grating frequency (see FIG. 2). In comparison, formulation Y2 shows only relatively low chromaticity yellow colors for any viewing angle.

Figure 3:
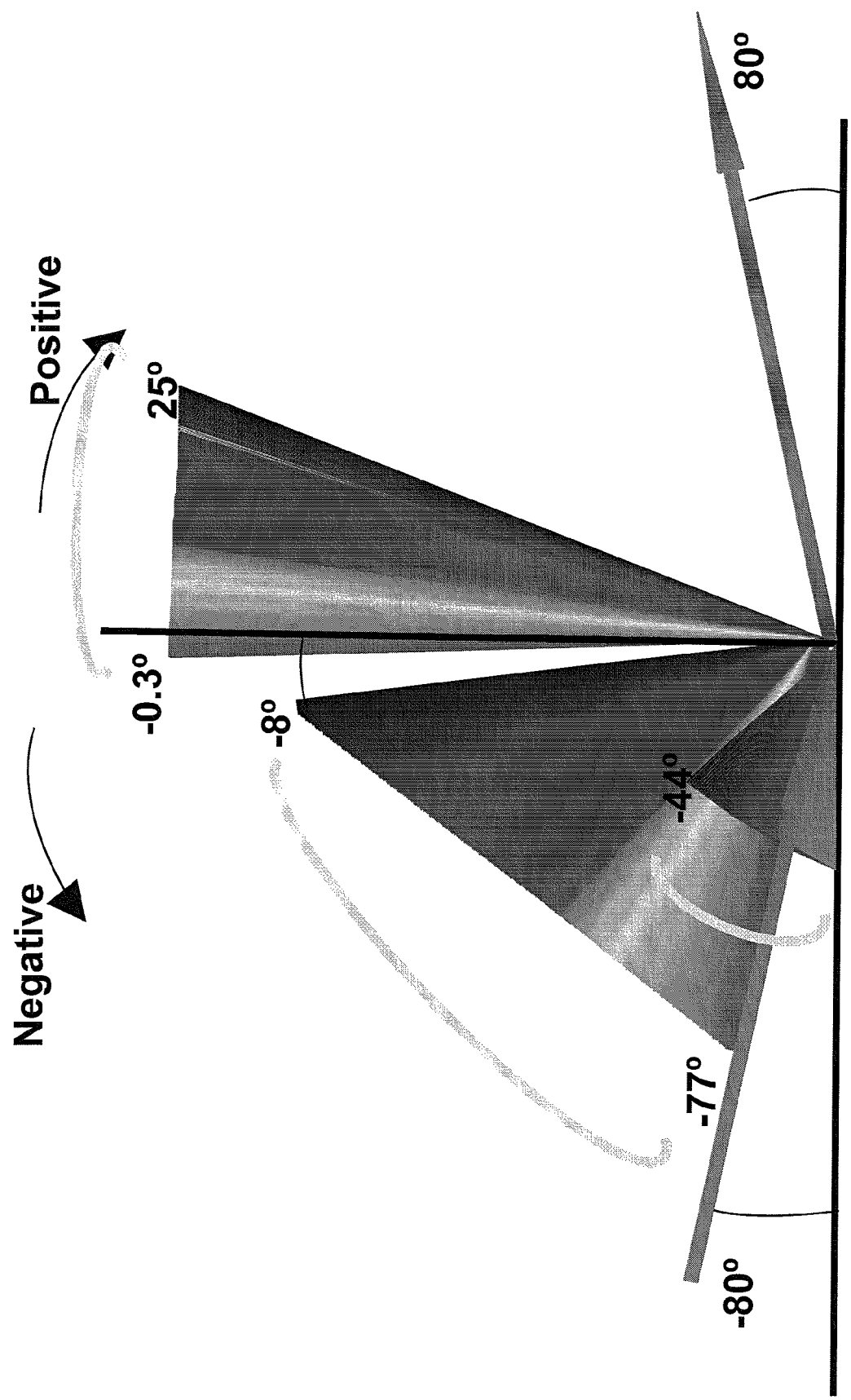
FIG. 3, schematically shows the separation of incident white light incident at −80° on a diffraction grating having a groove frequency of 1400 lines per millimeter (l/mm).
Figure 5:
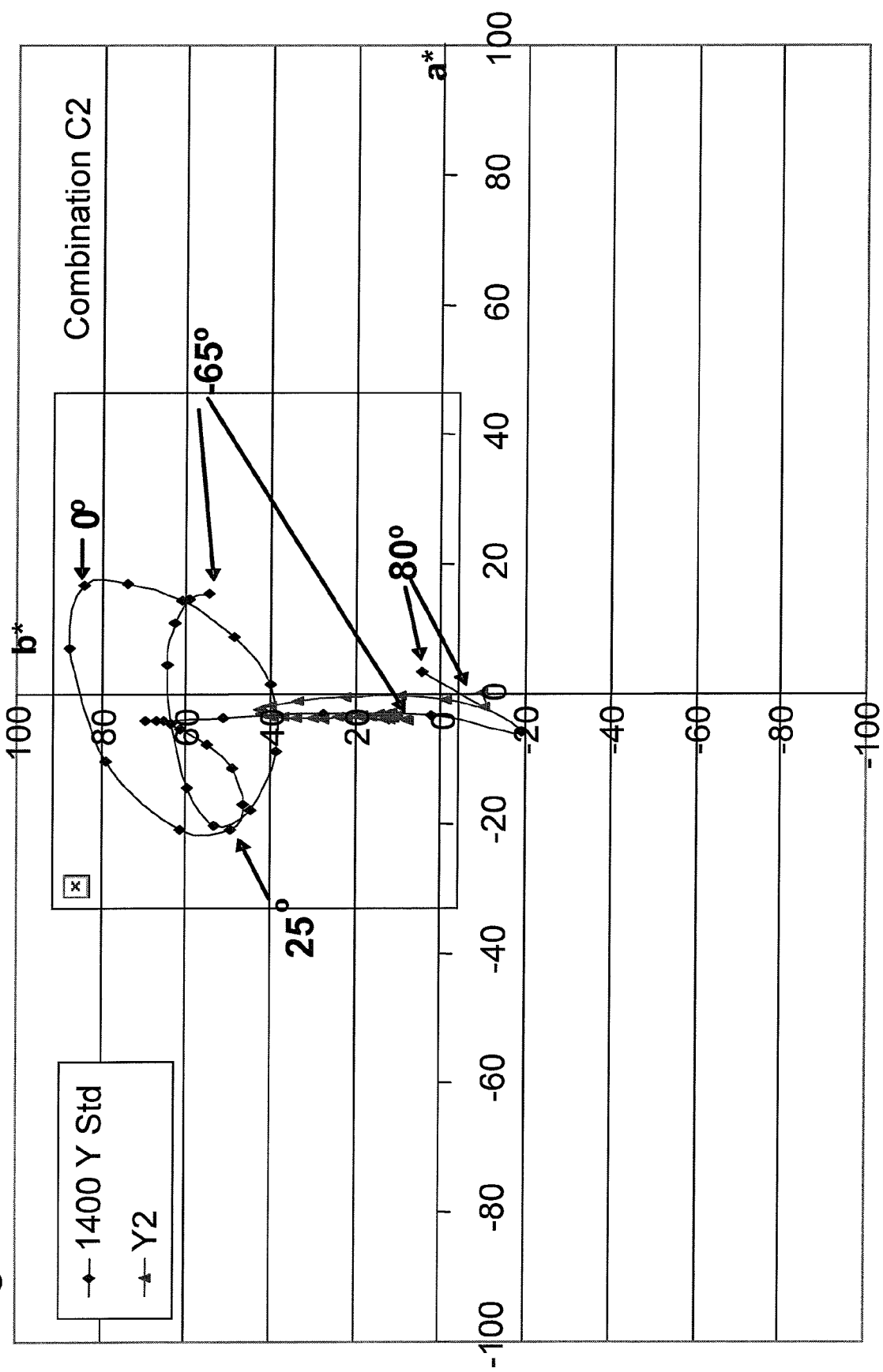
FIG. 5 is a plot illustrating color trajectories and chromaticity for the formulations corresponding to the combination C2 under direct illumination, where the angle of incidence was fixed at −80° and the viewing angle was varied between −65° to 80° in 5 degree increments.

FIG. 5 shows the results for the formulations corresponding to the combination C2. Formulation 1400Y shows diffractive colors corresponding to the three diffractive orders depending of the viewing angle (see FIG. 3). Starting at −65° in the $1^{st}$ quadrant the color moves to the $2^{nd}$ quadrant as the viewing angles changes to about 40°. In between −65° and −40° the dispersed colors correspond to a combination of the $-3^{rd}$ and $-2^{nd}$ orders and the yellow colorant. The relatively low chromaticity is due to the multiplicity of wavelengths presented. From −40° to about 0° the color trajectory moves back from the $2^{nd}$ to the $1^{st}$ quadrant (influence of only the $2^{nd}$ diffractive order and the yellow colorant) with a decrease in chromaticity till the trajectory finally moves back to the $2^{nd}$ quadrant between about 0° to +25° where the influence of the strong $1^{st}$ order again increases the chroma of the dispersed light. After +25° the color fades again since diffraction is not present at the higher angles for this grating frequency. These results as compared with the color trajectory of the formulation Y2 shows that as the viewing angles changes, the color and intensity of regions A and B will differ strongly from one to another.

Figure 6:
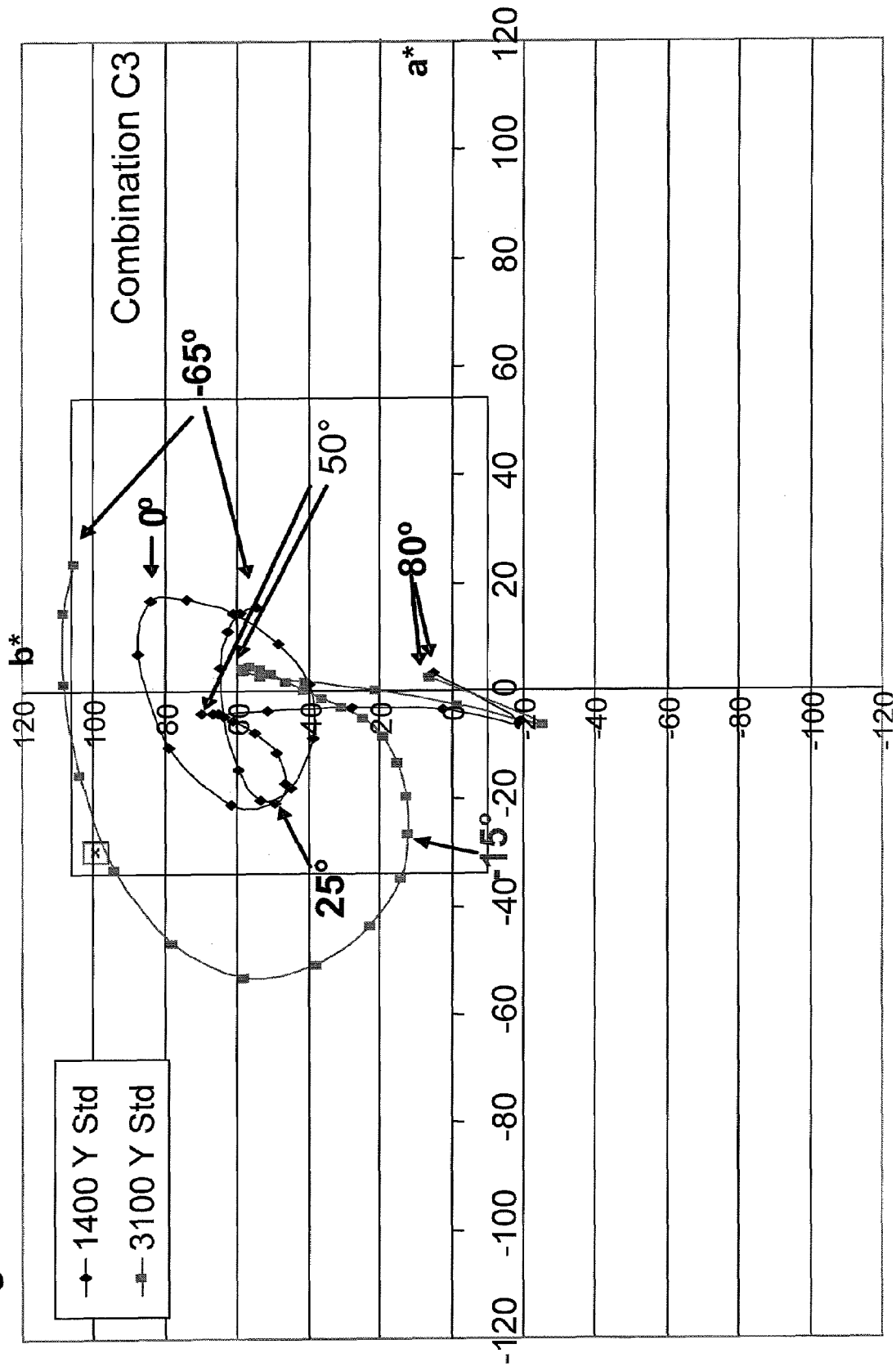
FIG. 6 is a plot illustrating 4 color trajectories and chromaticity for the formulations corresponding to the combination C3 under direct illumination, where the incidence angle was fixed at −80° and the viewing angle was varied between −65° to 80° in 5 degree increments.

The curves corresponding to composition C3 depicted by FIG. 6 were already explained and clearly shows a strong variation in appearance as the viewing angles change, demonstrating the metamerism due to the difference in grating frequencies of the pigments utilized.

A further characteristic of this embodiment is that if the OVID is rotated 90° in plane and then tilted, the side with the oriented diffractive flakes no longer displays diffractive colors under direct illumination.

In the instance where the side printed with the diffractive pigments is aligned along their grooves, it will present a much weaker light diffraction in all directions.

Another embodiment of the invention is described in conjunction with Table III.

TABLE III

|  | * Mg-Gn 3100 | * Mg-Gn Non Diffractive |
|---|---|---|
| Nazdar MP-170 screen ink | 5 | 5 |
| Mg-Gn 3100 Pigment | 0.75 | — |
| Mg-Gn non Diffractive Pigment | | |
| Nazdar Transparent Med. Yellow | — | 1.5 |

* values in mg

In the embodiment depicted by Table III two formulations are used to print regions A and B which are separate but adjacent to one another. The Mg-Gn pigment is a special effect pigment using pure thin film interference to achieve a color-shift when viewed at different angles. The pigment flakes are symmetrical and consist of a 5 layer stack, Cr/MgF2/Al/MgF2/Cr, with a thickness of MgF2 corresponding to a color shift from magenta at near normal incidence to greenish at higher angles of incidence. This pigment was blended with a yellow ink to match the color appearance of the diffractive Mg-GN 3100 pigment.

The Mg-Gn 3100 pigment is a special effect pigment using a combination of 3100 l/mm grating diffractive and thin film interference to change the color when viewed at different angles. The pigment flakes are produced by a 7 layer grated stack, Cr/MgF2/Al/M/Al/MgF2/Cr, where M is a metal layer with magnetic properties used in aligning the flakes in a magnetic field. This design has the same thickness of MgF2 as the Mg-Gn non diffractive pigment. However, the thickness of MgF2 could be slightly altered to get a better match of the color obtained with the non diffractive pigment.

The diffuse color measurement of regions A and B are presented in Table IV.

TABLE IV

|  | L* | A* | B* | C* | Hue | ΔHue | ΔE |
|---|---|---|---|---|---|---|---|
| Mg-Gn | 41.54 | 23.65 | −3.25 | 23.87 | 352.17 | | 5 |
| Mg-Gn 3100 | 43.6 | 27.97 | −6.04 | 28.61 | 347.81 | 4.36 | |

The resulting delta E and delta hue shows that the measured colors at the predetermined angle are very close and can be further improved by changing the formulations of table III.

Figure 7:
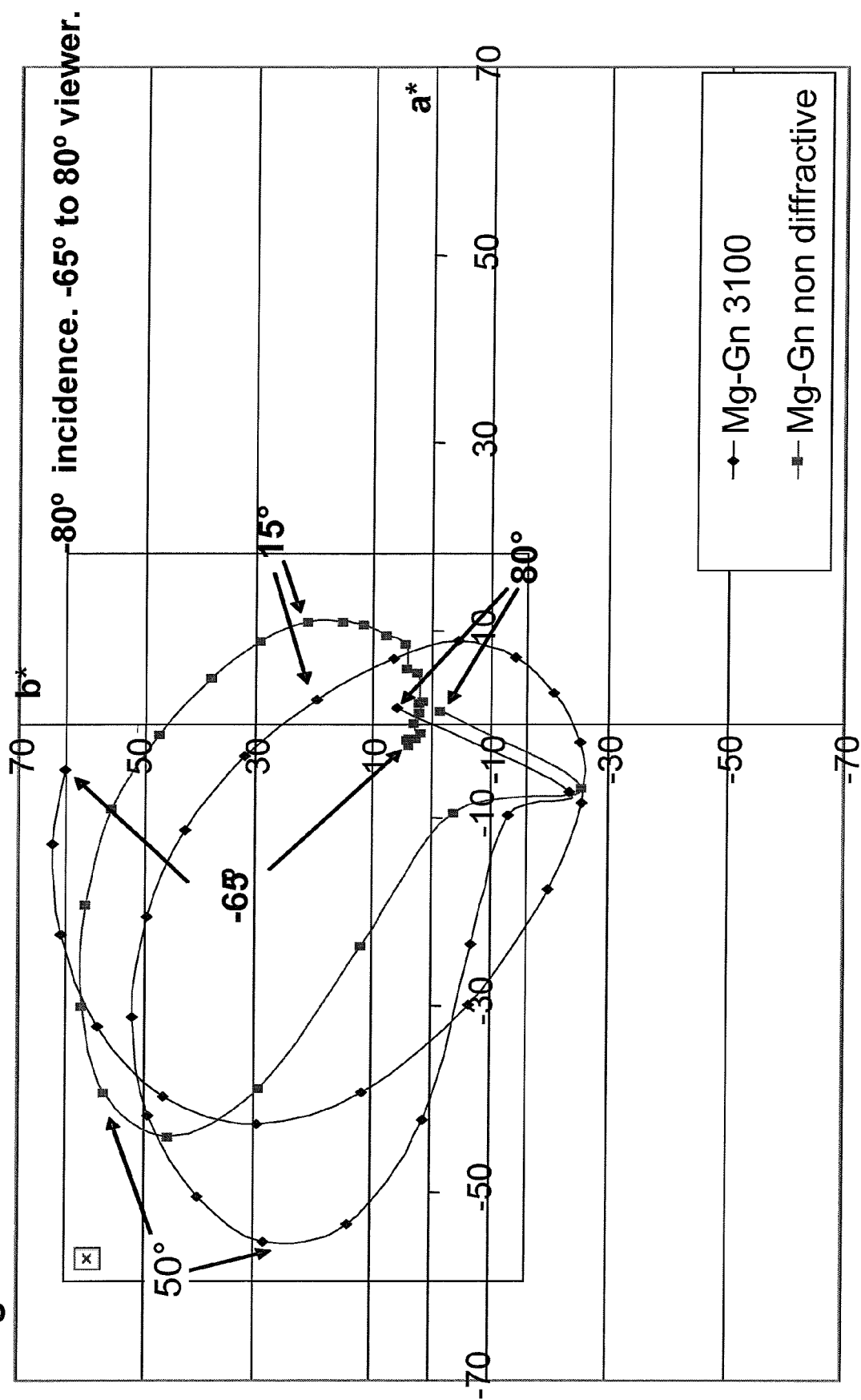
FIG. 7 shows the a*, b* color trajectory for regions A and B under direct illumination, where the incidence angle was fixed at −80° and the viewing angle was varied between −65° to 80° in 5 degree increments.

FIG. 7 shows the a*,b* color trajectory for sides A and B under direct illumination, where the incidence angle was fixed at −80° and the viewing angle was varied between −65° to 80° in 5 degree increments. A difference in color appearance with changes in viewing angle is noteworthy. From 80° to 15° the color trajectories of these two inks follow similar parallel paths. After 15°, the light dispersed from the 3100 l/mm diffractive pigment becomes dominant (see FIG. 3) and the color trajectory goes through the $4^{th}$, $3^{rd}$ and $2^{nd}$ quadrants. The color trajectory of the non diffractive Mg-Gn ink fades toward the center of the graph (achromatic point). Finally, when the Mg-GN 3100 print shows a high chroma yellow color that is diffracted back toward the illuminating source at an angle of −65, the Mg-Gn non diffractive ink is totally colorless as represented by the color coordinates close to the achromatic point.

As for the cases of combinations C1, C2, and C3, a further characteristic of this group of sub-embodiments is that if the OVID is rotated 90° in plane and then tilted, the side with the oriented diffractive flakes no longer displays diffractive colors under direct illumination but only the interference color trajectories (Magenta-Green in this case) from the thin film design are seen.

In the same way, if the region printed with the diffractive pigments is not groove aligned, it will present a weaker light diffraction in all directions.

An alternative embodiment is shown, in reference to Table V which depicts the two formulations used to print areas A and B. The Gn-Bl pigment is a special effect pigment using pure thin film interference to produce a color change when viewed at different angles.

TABLE V

|  | * Gn-Bl 125 | * RD8 |
| --- | --- | --- |
| Nazdar MP- 170 | 5 | 5 |
| GN-BL 125 | 0.75 | — |
| U.S. Aluminium D507 - GR | — | 1 |
| Gn-Bl non Diffractive Pigment | — | 0.4 |
| ENglehard Veg. Black Olive 90COZ | — | 0.5 |

The pigment flakes are produced by a 5 layer stack, Cr/MgF2/Al/MgF2/Cr, with a thickness of MgF2 corresponding to a color shifting from green at near normal incidence to bluish at higher angles. This pigment was blended with a commercially available olive ink and a metallic aluminum pigment to match the color appearance of the diffractive Gn-Bl 125 pigment.

Figure 8:
FIG. 8 is photograph of a green-blue color shifting special effect having a grating within the flakes with 125 l/mm.

The Gn-Bl 125 pigment is a special effect pigment using a combination of 125 l/mm grating having an 8 micron pitch with 1 micron modulation. Here diffractive and thin film interference occurs to change the color when viewed at different angles. A magnified view of the pigment is shown in FIG. 8.

For this low frequency grating, the separation of incident white light when illuminated at −80° incidence produces a multitude of diffractive orders superimposed between them. Taking into account only the extremes in the visible spectrum, the first diffractive order that appears is the $-1^{st}$ order violet (400 nm) at 69° and the last visible red (700 nm) corresponding to the −22 order is diffractive at −70°.

The diffractive pigment flakes are produced by depositing and stripping off a 7 layer grated stack, Cr/MgF2/Al/magnetic layer/Al/MgF2/Cr, with the same thickness of MgF2 as the Gn-Bl non diffractive pigment.

Under diffuse illumination, the resulting delta E and delta hue values in Table VI shows that the measured colors are very similar and for all intents and purposes, match.

TABLE VI

|  | L* | A* | B* | C* | Hue | ΔHue | ΔE |
| --- | --- | --- | --- | --- | --- | --- | --- |
| Gn-Bl 125 | 55.35 | −31.32 | 22.1 | 38.33 | 144.79 |  |  |
| RD8 | 62.51 | −25.84 | 25.84 | 36.27 | 135.44 | 9.35 | 9 |

Figure 9:
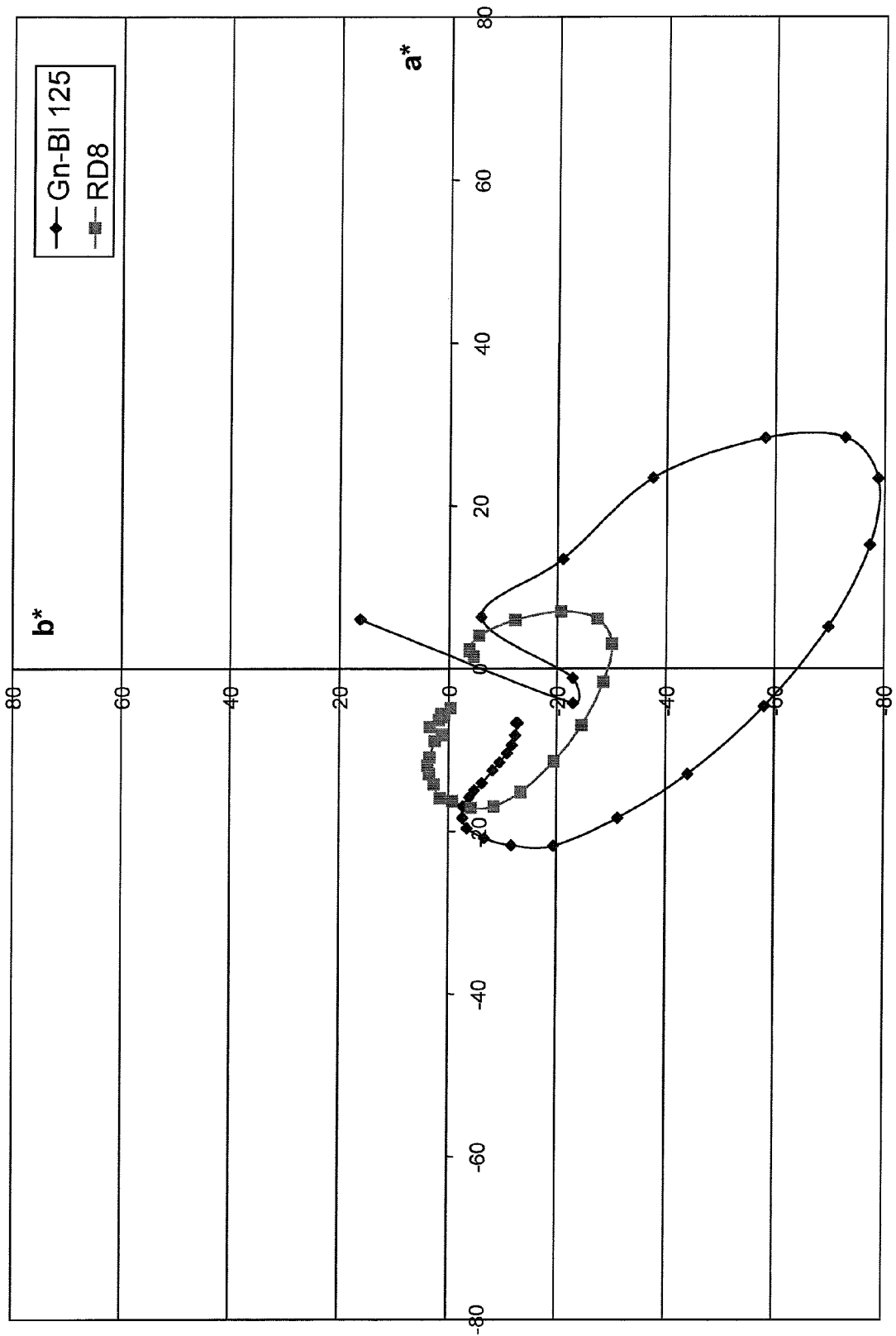
FIG. 9 is a plot illustrating the a*, b* color trajectory for regions A and B, as formulated in Table V, under direct illumination where the incidence angle was fixed at −80° and the viewing angle was varied between −65° to 80° in 5 degree increments.

FIG. 9 shows the a*,b* color trajectory for sides or areas A and B, as formulated in Table V, under direct illumination where the incidence angle was fixed at −80° and the viewing angle was varied between −65° to 80° in 5 degree increments. Both inks travel through the $3^{rd}$ and $4^{th}$ quadrants. However, the chromaticity of the Gn-Bl 125 is much higher than RD8 as evidenced by the length of the color trajectory from the achromatic point.

Figure 10B:
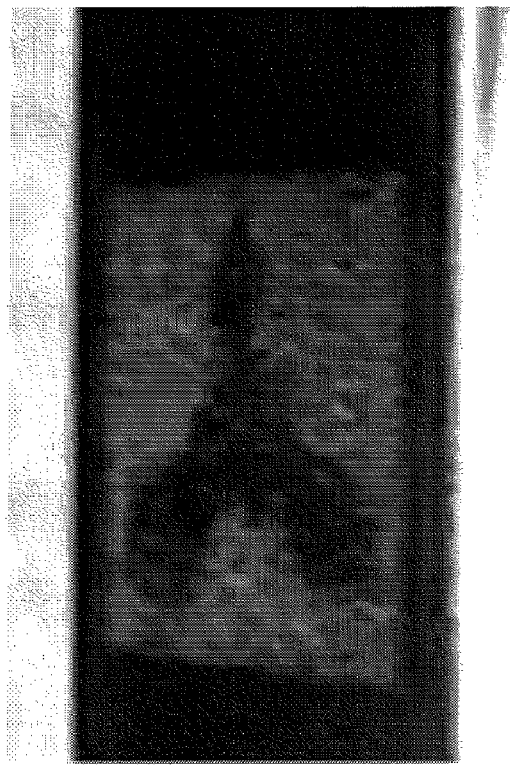
FIGS. 10a and 10b are views the same image viewed at different angles made using a Rd-Go diffractive pigment with a frequency of 3100 l/mm.
Figure 10A:
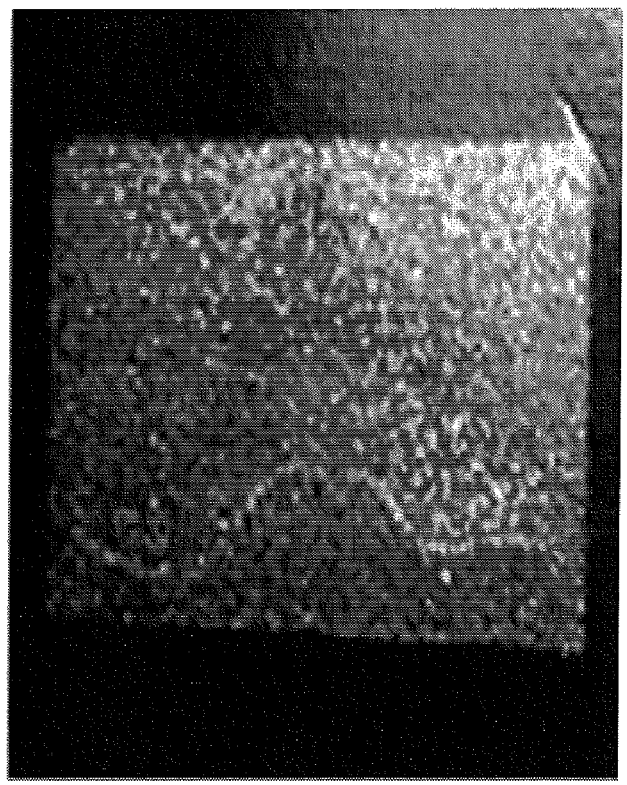

Referring now to FIGS. 10a and 10b, an image is shown wherein a bird is printed upon a substrate with non-diffractive color shifting pigment. The square surrounding the bird is printed with a diffractive 3100 pigment and the bird was printed with a non-diffractive but color shifting pigment. In this instance, these properties are utilized to produce DOVIDs that show interesting visual properties. These DOVIDs under diffuse illumination show iridescent color shift effects that are quite different to holographic effects. When illuminated at high angles however, diffractive colors become visible. FIG. 1e0a shows an example of this type of device; for near normal angles of incidence the two areas, that is the bird and the surrounding region show the same color (red). Under diffuse illumination, a shift to gold occurs. However, when illuminated at high angles as shown in FIG. 10a, only the background area corresponding to the diffractive pigment is seen at high viewing angles. The non-diffractive area corresponding to the shape of the bird appears dark. Using additive color theory, one can formulate a pigment with or without special effects such as color shifting that matches a non-diffractive pigment at one angle but changes to a different color at other angles. Devices of this kind can be described as having diffractive metameric properties providing easy to identify "hidden" effects attractive to the document security market.

As was described heretofore, the diffractive pigments may be comprised of single layer flakes in a binder wherein the binder may be tinted, or multi-layer flakes may be used.

In one embodiment the flakes may consist of a single magnetic layer (e.g. nickel, iron, cobalt, etc) deposited on a diffraction grating. In this instance the magnetic layer is deposited upon a base layer that is embossed.

Alternatively, a 3-layer design may be implemented wherein another material such as Aluminum, Copper, or TiN surrounds the magnetic layer to produce color inherent to the material.

Alternatively, a 5-layer design may be, deposited on a diffraction grating, where a protective material, for example, a ceramic-like material is deposited over the two or three layer structures mentioned above.

Alternatively, a 7-layer design may be deposited upon a diffraction grating, wherein the stack of layers includes absorber/dielectric/reflector/magnetic material/reflector/dielectric/absorber (A/D/R/M/R/D/A), where the index of refraction of the dielectric layer is less than 1.65. This creates an optically variable design by thin film interference in addition to the diffractive interference produced by the grating, In another embodiment a 7-layer design as described above may be implemented wherein the index of refraction of the dielectric layer is more than 1.65. This produces a slower shifting optically variable design in addition to the diffractive interference produced by the grating.

In yet an alternative embodiment the diffractive flakes may be embodied by a 5-layer design deposited on a diffraction grating, consisting of an absorber/dielectric/reflector/dielectric/absorber where the absorber is a magnetic material.

In the various aforementioned optical designs previously described the frequency of the grating may be modified, resulting in diffractive light dispersion at varying angles.

It should be understood that this invention includes an OVID consisting of adjacent areas printed with any combination of the above designs, such that under one set of illumination and viewing conditions, the areas are similar or the same in appearance and color. As is shown in FIGS. 1c and 1d, the two regions may be adjacent to one another by way of being side-by-side as structures 12 and 14 are shown to be in FIG. 1c, or on opposite sides of the substrate 10 as shown in FIG. 1d.

In the embodiments described heretofore, the diffractive and non-diffractive pigments have been described as having a color, for example for diffractive pigments at angles where diffraction was absent. This color is either the color of the material or a color of a dye which surrounds the material, or is a color effect such as color-shifting provided by the optical structure, or is a combination thereof.

However, in a less preferred embodiment semitransparent diffractive flakes can be used, wherein the diffractive semi-transparent flakes exhibit no diffraction at certain viewing angles, and wherein the region they cover and an adjacent region match in color by virtue of the transparency of the diffractive semi-transparent flakes. For example, if the flakes in FIG. 1a have a first coating 14 directly upon the substrate that covers the entire substrate and a second coating 12 of non-diffractive flakes that is the same color as the substrate, at certain angles the coating 14 will be transparent and absent of diffraction and there will a color match between the letters JDSU and the substrate. It will appear as if the coating 14 is matched in color to the coating 12.

Notwithstanding, in the preferred embodiment this invention uses the region of viewing where there is no diffraction seen from the diffractive coating for a specific illumination angle and match the native color of the diffractive pigment at the zero order with the other different adjacent coating.

The diffractive flakes may be groove aligned with one another so that diffractive effects seen can be maximized. Furthermore, all or some of the flakes can be aligned out of the plane of the substrate to be upstanding, for example at 45 degrees to the substrate. By having regions that are in-plane and groove aligned, and other regions that are out of plane groove aligned, matches in color can be obtained at different angles; by way of example for a match at normal and at a color match at 45 degrees groups of diffractive flakes could be oriented and out of plane to achieve this.

Figure 1A:
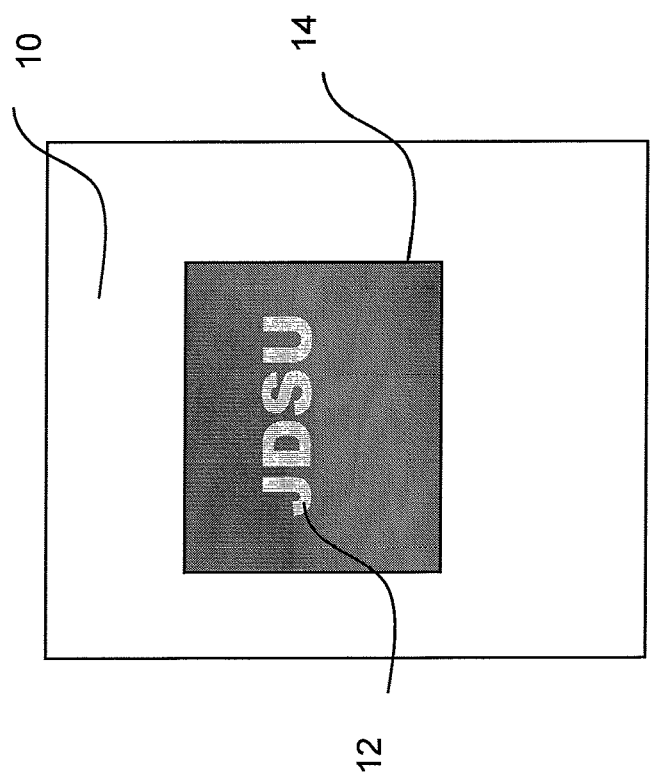
FIG. 1a is a plan view of a substrate having a first non-diffractive coating forming a background to indicia in the form of the letters JDSU formed from diffractive pigment flakes.
Figure 1E:
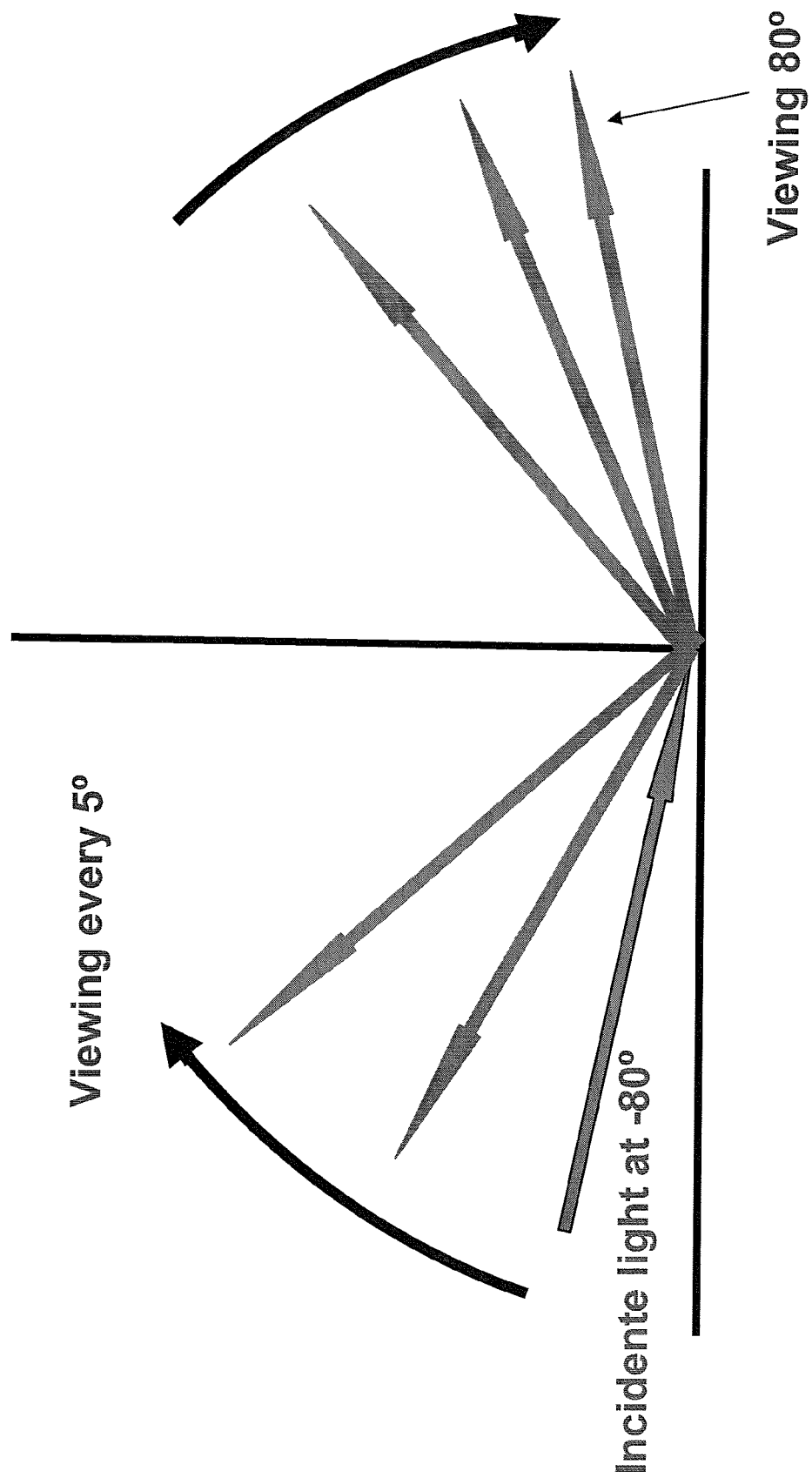
FIG. 1e is a drawing showing illumination of a substrate fixed at −80° incidence and the viewing angle as varied from −80° to 80° in 5 degree increments.

In the preferred embodiment of this invention, for example as shown in FIGS. 1a through 1d, optical structures are formed in separate regions and these structures are separate from one another and discernable. However the indicia JDSU as coating 12 as shown in FIG. 1a could be applied over diffractive coating 14 covering it. In this manner the letters JDSU would still be visible and distinguishable at angles where there was no color match; and would be the "same color" at angles where there was a color match and only zero order diffraction occurs.

In a less preferred embodiment of the invention the two different types of optical flakes can be mixed together in a desired ratio, blending into a single same color in the absence of diffraction, and having a blended appearance of a perceived different color in the presence of diffraction. Of course this blend could also be applied to a first region that is adjacent to a region having only the same non-diffractive flakes, the two regions thereby matching in color in the absence of diffraction being seen.

While the present invention has been described with reference to several embodiments thereof, those skilled in the art will recognize various changes that may be made without departing from the spirit and scope of the claimed invention. Accordingly, the invention is not limited to what is shown in the drawings and described in the specification, but only as indicated in the appended claims.

What is claimed is:

1. An optically variable article comprising:
a substrate having a first surface and a second surface; first and second optical devices having different optical properties formed on first and second regions, respectively, carried by the first surface or the second surface of the substrate, one of the first and second optical devices being optically variable and forming a pair with the other of the first and second optical devices, wherein said first and second optical devices are carried by the substrate in spaced-apart positions to permit viewing at the same time by the human eye, wherein said first and second optical devices appear to the human eye to have the same matching color at one angle of incidence between 0 degrees and 90 degrees for a color match angle and being without color match at other angles of incidence, wherein the first optical device comprises a diffractive optical structure having a diffractive pattern defined therein or thereon ,wherein the second optical device is diffractive or color shifting or is comprised of reflective flakes in a tinted carrier, wherein the diffractive optical structure includes magnetically aligned diffractive flakes.

2. An optically variable article as defined in claim 1 wherein the magnetically aligned diffractive flakes are color shifting flakes.

3. An optically variable article as defined in claim 2 wherein one of the first and second regions forms a logo, indicia, or image and wherein the other of the first and second regions forms a visible background to the logo, indicia or image at angles where the two regions are unmatched in color.

4. An optically variable article as defined in claim 3 wherein the color match angle is angle of incidence of 30 degrees or greater.

5. An optically variable article as defined in claim 4 wherein there is essentially no visible diffraction when a color match is seen, and wherein the second optical device includes a plurality of optical effect flakes.

6. An optically variable article as defined in claim 4 wherein one of said first and second optical devices is non-optically variable.

7. An optically variable article as defined in claim 6, wherein wherein one of the first and second device have flakes that are disposed in a colored carrier.

8. An optically variable article as defined in claim 7 wherein at least one of the first and second optical devices includes a metal-dielectric interference stack.

9. An optically variable article as defined in claim 2 wherein a plurality of the optically variable diffractive flakes are oriented to be out-of-plane and at least partially upstanding with respect to the substrate.

* * * * *

UNITED STATES PATENT AND TRADEMARK OFFICE
CERTIFICATE OF CORRECTION

PATENT NO.        : 7,729,026 B2
APPLICATION NO.   : 11/609406
DATED             : June 1, 2010
INVENTOR(S)       : Argoitia et al.

Page 1 of 1

It is certified that error appears in the above-identified patent and that said Letters Patent is hereby corrected as shown below:

Col. 6, line 6, "Y3190" should read -- Y3100 --

Signed and Sealed this
Twenty-second Day of November, 2011

David J. Kappos
*Director of the United States Patent and Trademark Office*